United States Patent
Chang

(10) Patent No.: US 9,442,268 B2
(45) Date of Patent: Sep. 13, 2016

(54) ANNULAR OPTICAL ELEMENT AND OPTICAL PHOTOGRAPHING LENS ASSEMBLY

(71) Applicant: LARGAN PRECISION CO., LTD., Taichung (TW)

(72) Inventor: Ming-Shun Chang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 261 days.

(21) Appl. No.: 14/261,413

(22) Filed: Apr. 24, 2014

(65) Prior Publication Data
US 2015/0234145 A1   Aug. 20, 2015

(30) Foreign Application Priority Data

Feb. 18, 2014  (TW) .............................. 103202795 U

(51) Int. Cl.
  *G02B 7/02*  (2006.01)
  *G02B 5/00*  (2006.01)
  *G02B 13/00* (2006.01)

(52) U.S. Cl.
  CPC ................. *G02B 7/02* (2013.01); *G02B 5/005* (2013.01); *G02B 7/021* (2013.01); *G02B 7/022* (2013.01); *G02B 13/0045* (2013.01)

(58) Field of Classification Search
  CPC ........ G02B 7/02; G02B 7/022; G02B 7/021; G02B 7/7026; G02B 5/005; G02B 13/0045; G02B 27/0018
  See application file for complete search history.

(56) References Cited

U.S. PATENT DOCUMENTS

2009/0310223 A1* 12/2009 Matsuoka ............. G02B 5/005
                                                           359/601

* cited by examiner

*Primary Examiner* — Joseph P Martinez
(74) *Attorney, Agent, or Firm* — CKC & Partners Co., Ltd.

(57) ABSTRACT

An annular optical element having a central opening includes, in order from the central opening to an outer boundary, an inner annular part, and an outer annular part connected to the inner annular part. A thickness of the annular optical element is uniform.

21 Claims, 14 Drawing Sheets

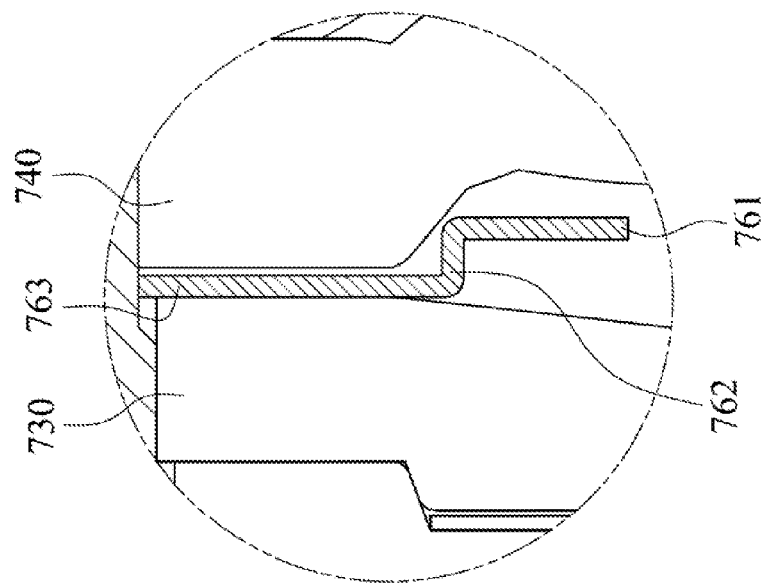
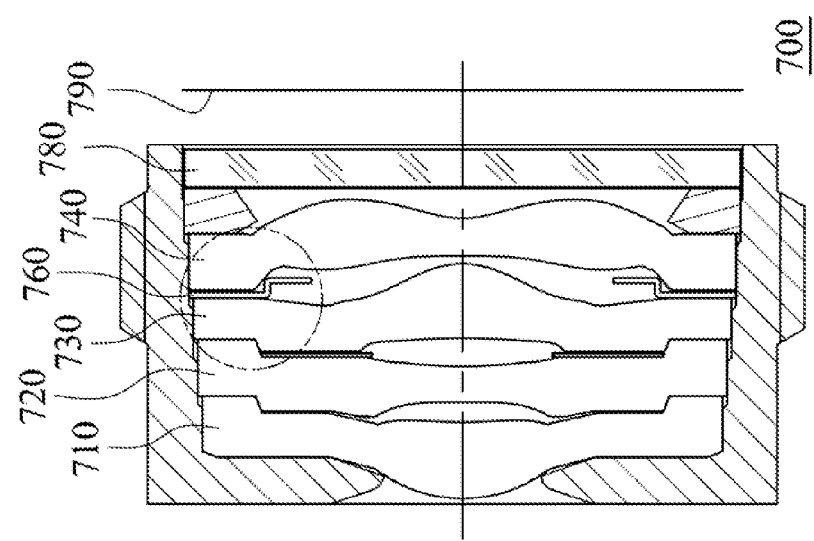
Fig. 7B
Fig. 7A

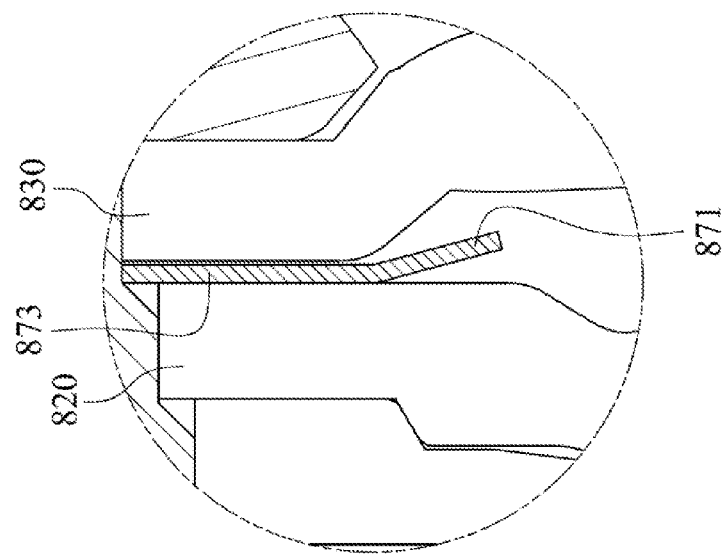
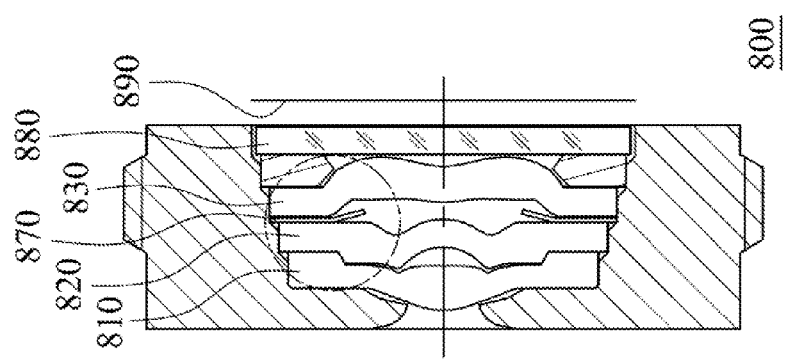
Fig. 8B
Fig. 8A

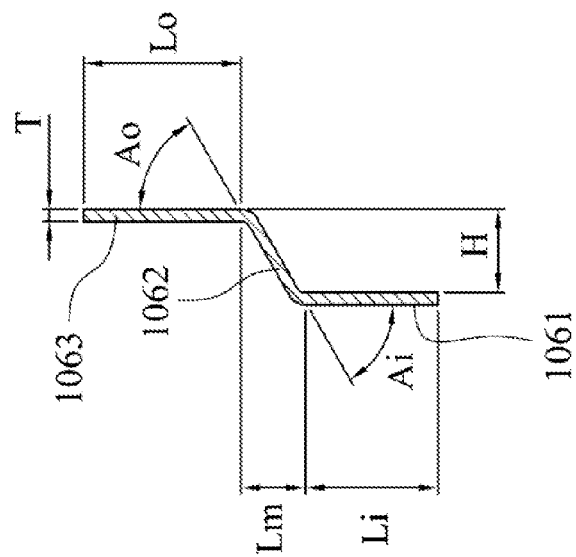
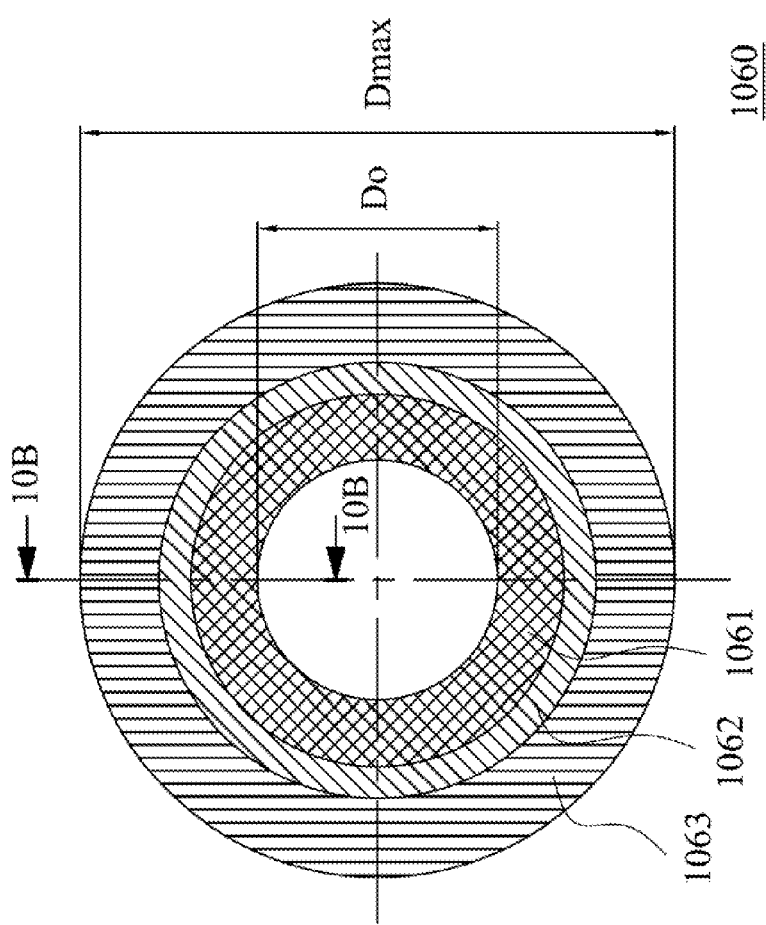
Fig. 10B
Fig. 10A

ANNULAR OPTICAL ELEMENT AND OPTICAL PHOTOGRAPHING LENS ASSEMBLY

RELATED APPLICATIONS

This application claims priority to Taiwan Application Serial Number 103202795, filed Feb. 18, 2014, which is herein incorporated by reference.

BACKGROUND

1. Technical Field

The present invention relates to an annular optical element. More particularly, the present invention relates to a multi-part annular optical element.

2. Description of Related Art

In recent years, with the popularity of mobile terminals having camera functionalities, the demand of miniaturized optical systems has been increasing. As the evolvement toward the field of higher megapixels of miniaturized optical systems, both of the requirements of compact size and high imaging quality should be satisfied.

The conventional miniaturized optical system includes a plurality of lens elements and an optical element disposed between any two of the lens elements, thus unexpected incident light can be avoided for enhancing the image quality. However, the total track length of the optical system would be lengthened due to the arrangement of the optical element, and the arrangement between the lens elements and the optical element would be restricted by the optical element.

SUMMARY

According to one aspect of the present disclosure, an annular optical element which having a central opening includes, in order from the central opening to an outer boundary, an inner annular part, a middle annular part and an outer annular part, wherein the middle annular part is connected to the inner annular part, and the outer annular part is connected to the middle annular part. When a thickness of the annular optical element is uniform, an angle between the outer annular part and the middle annular part is Ao, and an angle between the middle annular part and the inner annular part is Ai, the following conditions are satisfied:

10 degrees<|Ao|≤90 degrees; and
10 degrees<|Ai|≤90 degrees.

According to another aspect of the present disclosure, an optical photographing lens assembly includes, in order from an object side to an image side, a first lens element, an annular optical element and a second lens element. The annular optical element is located between the first lens element and the second lens element. The annular optical element has a central opening and in order from the central opening to an outer boundary the annular optical element includes an inner annular part, a middle annular part and an outer annular part, wherein the middle annular part is connected to the inner annular part, and the outer annular part is connected to the middle annular part. A thickness of the annular optical element is uniform. When an angle between the outer annular part and the middle annular part is Ao, and an angle between the middle annular part and the inner annular part is Ai, the following conditions are satisfied:

10 degrees<|Ao|≤90 degrees; and
10 degrees<|Ai|≤90 degrees.

According to yet another aspect of the present disclosure, an annular optical element having a central opening includes, in order from the central opening to an outer boundary, an inner annular part and an outer annular part, wherein the outer annular part is connected to the inner annular part. A thickness of the annular optical element is uniform. When an angle between the outer annular part and the inner annular part is A, the following condition is satisfied:

0 degree<|A|≤60 degrees.

BRIEF DESCRIPTION OF THE DRAWINGS

FIG. 7A is a schematic view of an optical photographing lens assembly according to 7th embodiment of the present disclosure;

FIG. 7B is an enlarged view of an annular optical element of the optical photographing lens assembly of FIG. 7A;

FIG. 8A is a schematic view of an optical photographing lens assembly according to 8th embodiment of the present disclosure;

FIG. 8B is an enlarged view of an annular optical element of the optical photographing lens assembly of FIG. 8A;

FIG. 10A is a schematic view of an annular optical element according to one aspect of the present disclosure;

FIG. 10B is a cross-section view along line 10B-10B in FIG. 10A;

DETAILED DESCRIPTION

Figures 1A, 1B:
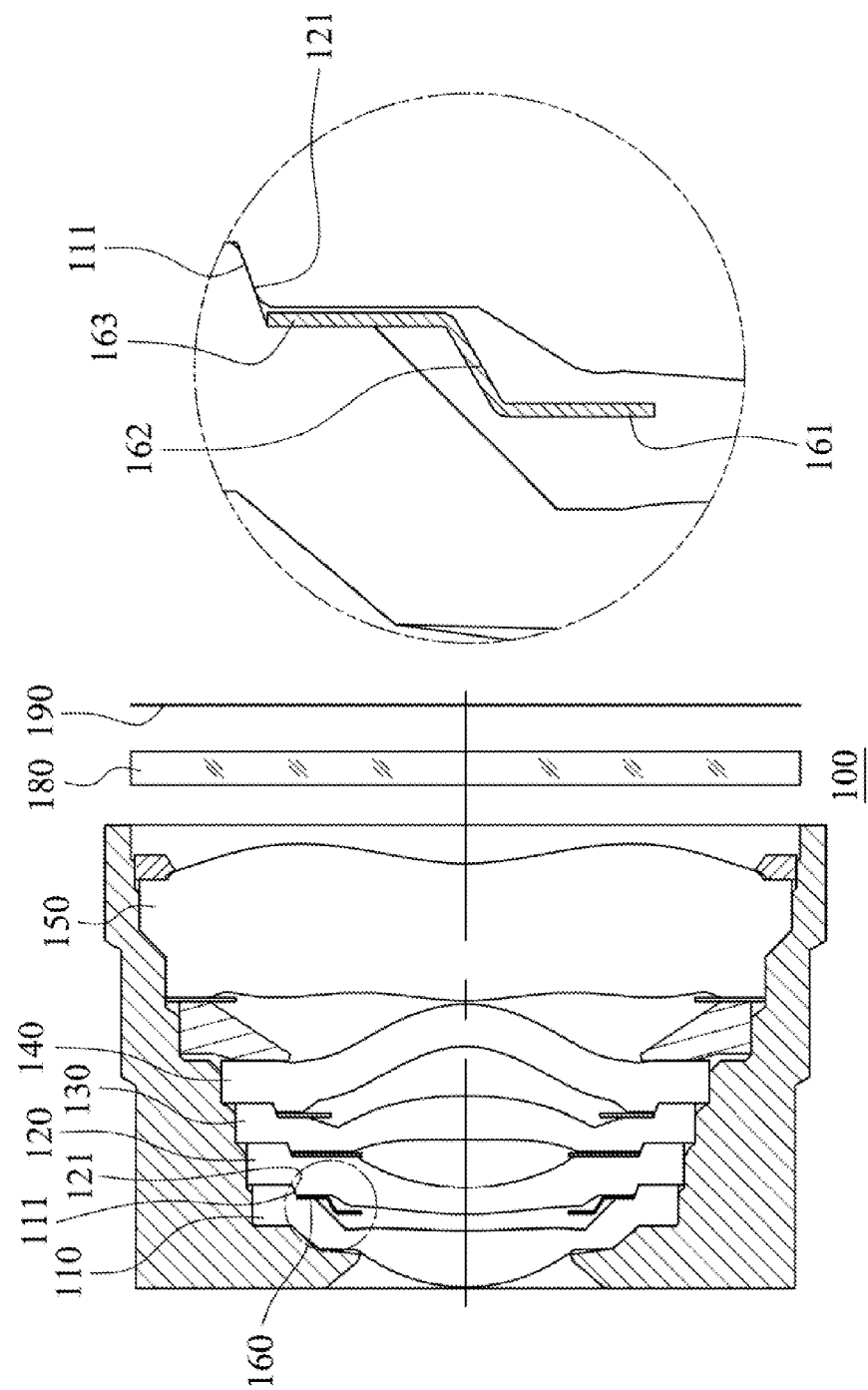
FIG. 1A is a schematic view of an optical photographing lens assembly according to 1st embodiment of the present disclosure.
FIG. 1B is an enlarged view of an annular optical element of the optical photographing lens assembly of FIG. 1A.

FIG. 10A is a schematic view of an annular optical element 1060 according to one aspect of the present disclosure. FIG. 10B is a cross-section view along line 10B-10B in FIG. 10A. In FIGS. 10A and 10B, the annular optical element 1060 having a central opening includes, in order from the central opening to an outer boundary, an inner annular part 1061, a middle annular part 1062 and an outer annular part 1063, wherein the middle annular part 1062 is connected to the inner annular part 1061, and the outer annular part 1063 is connected to the middle annular part 1062.

In detail, a thickness of the annular optical element 1060 is uniform, that is, thicknesses of the inner annular part 1061, the middle annular part 1062 and the outer annular part 1063 are the same, and the thickness from the central opening to the outer boundary of each of the inner annular part 1061, the middle annular part 1062 and the outer annular part 1063 is uniform. Therefore, it is favorable for the manufacture of the annular optical element 1060.

In FIG. 10B, when an angle between the outer annular part 1063 and the middle annular part 1062 is Ao, and an angle between the middle annular part 1062 and the inner annular part 1061 is Ai, the following conditions are satisfied: 10 degrees<|Ao|≤90 degrees; and 10 degrees<|Ai|≤90 degrees. Therefore, the annular optical element 1060 can be located between two lens elements of a lens assembly for enhancing the image quality. Further, the annular optical element 1060 is suitable for cooperating with the adjacent lens elements, so that the lens design arrangement of the lens assembly would not be limited by the allocation of the annular optical element 1060. Preferably, the following conditions are satisfied: 20 degrees<|Ao|≤90 degrees; and 20 degrees<|Ai|≤90 degrees. Furthermore, the following condition can be satisfied: |Ao|=|Ai|.

The central opening of the annular optical element 1060 has a central axis, when a minimum distance on the central axis between an end of a surface of the outer annular part 1063 which is closest to the central axis and an end of a surface of the inner annular part 1061 which is closest to the central axis is H, wherein the surface of the outer annular part 1063 and the surface of the inner annular part 1061 are located on the same side of the annular optical element 1060, the following condition is satisfied: 0.01 mm<H<0.20 mm. Therefore, the distance between the two lens elements which are disposed on the two sides of the annular optical element 1060 can be controlled.

When a thickness of the annular optical element 1060 is T, the following condition is satisfied: 0.01 mm<T<0.10 mm. Therefore, it is favorable for the manufacture of the annular optical element 1060. Preferably, the following condition is satisfied: 0.01 mm<T<0.05 mm.

The annular optical element 1060 can be made of plastic material or metallic material. When the annular optical element 1060 is made of plastic material, the manufacturing cost can be decreased. When the annular optical element 1060 is made of metallic material, it is favorable for the manufacture of the annular optical element 1060 due to the ductility thereof.

When the minimum distance on the central axis between the end of the surface of the outer annular part 1063 which is closest to the central axis and the end of the surface of the inner annular part 1061 which is closest to the central axis is H, wherein the surface of the outer annular part 1063 and the surface of the inner annular part 1061 are located on the same side of the annular optical element 1060, and a distance perpendicular to the central axis between two ends of the inner annular part 1061 is Li, the following condition is satisfied: 0.1<H/Li<1.2. Therefore, it is favorable for the manufacture of the annular optical element 1060. Preferably, the following condition is satisfied: 0.1<H/Li<0.7.

In FIG. 10A, when a diameter of the central opening of the annular optical element 1060 is Do, and a maximum outer diameter of the annular optical element 1060 is Dmax, the following condition is satisfied: 0.3<Do/Dmax<0.7. Therefore, it is favorable for the manufacture of the annular optical element 1060.

Figure 11B:
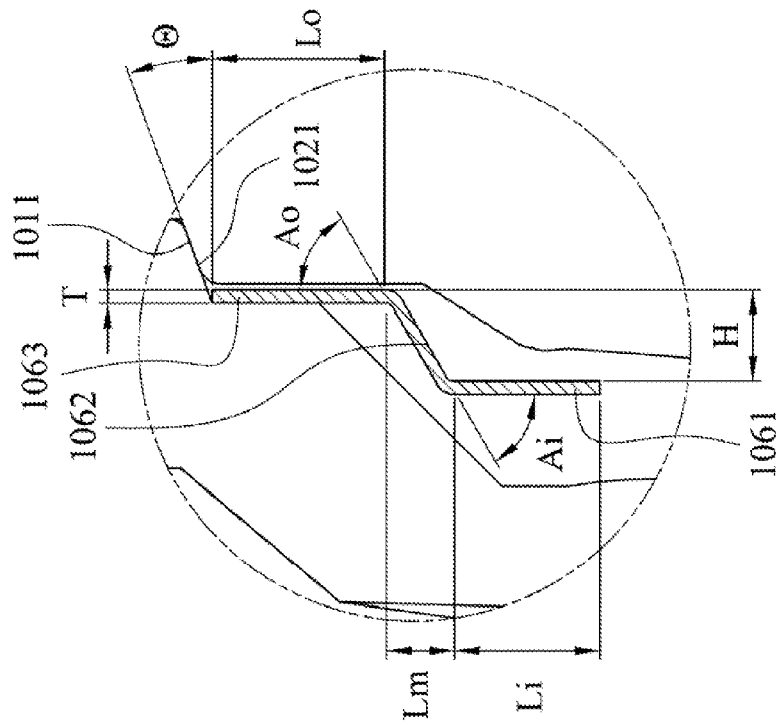
FIG. 11B is an enlarged view showing the parameters of the optical photographing lens assembly of FIG. 11A.
Figure 11A:
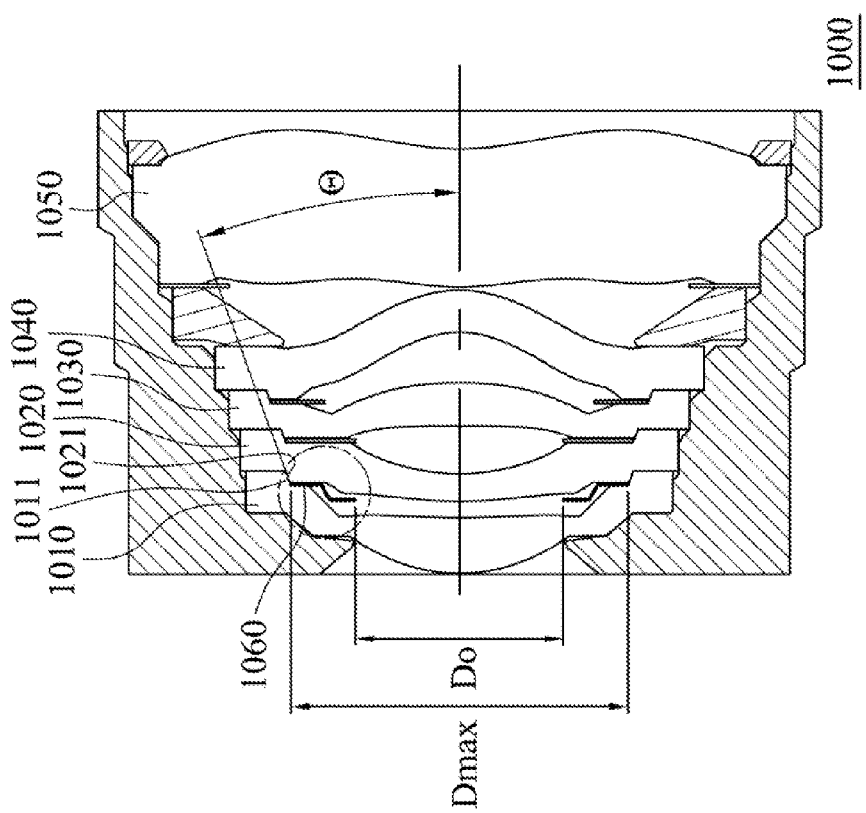
FIG. 11A is a schematic view of an optical photographing lens assembly according to another aspect of the present disclosure.

FIG. 11A is a schematic view of an optical photographing lens assembly 1000 according to another aspect of the present disclosure. FIG. 11B is an enlarged view showing the parameters of the optical photographing lens assembly 1000 of FIG. 11A. In FIG. 11A, the optical photographing lens assembly 1000 includes, in order from an object side to an image side, a first lens element 1010, an annular optical element 1060, a second lens element 1020, a third lens element 1030, a fourth lens element 1040 and a fifth lens element 1050, wherein the annular optical element 1060 is located between the first lens element 1010 and the second lens element 1020. The definition of the parameters in FIGS. 11A and 11B is the same to the foregoing parameters in FIGS. 10A and 10B, and will not state again herein. Therefore, the annular optical element 1060 is located between the first lens element 1010 and the second lens element 1020 for enhancing the image quality. Further, the annular optical element 1060 is suitable for cooperating with the surface shape of the adjacent lens elements (the first lens element 1010 and the second lens element 1020), so that the arrangement of the optical photographing lens assembly 1000 would not be limited of the annular optical element 1060.

Furthermore, in the optical photographing lens assembly 1000, each of the first lens element 1010 and the second lens element 1020 includes a joint surface 1011, 1021, the joint surface 1011 of the first lens element 1010 and the joint surface 1021 of the second lens element 1020 are connected to each other, when an angle between each of the joint surfaces 1011, 1021 and the central axis is Θ, and the following condition is satisfied: 0 degree≤Θ<60 degrees. Therefore, it is favorable for the fabrication of the optical photographing lens assembly 1000 by the arrangement of the angle between each of the joint surfaces 1011, 1021 and the central axis.

Figure 12B:
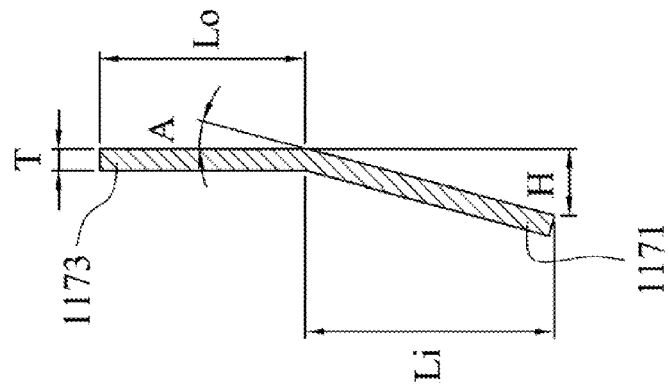
FIG. 12B is a cross-section view of the annular optical element along the line 12B-12B of FIG. 12A.
Figure 12A:
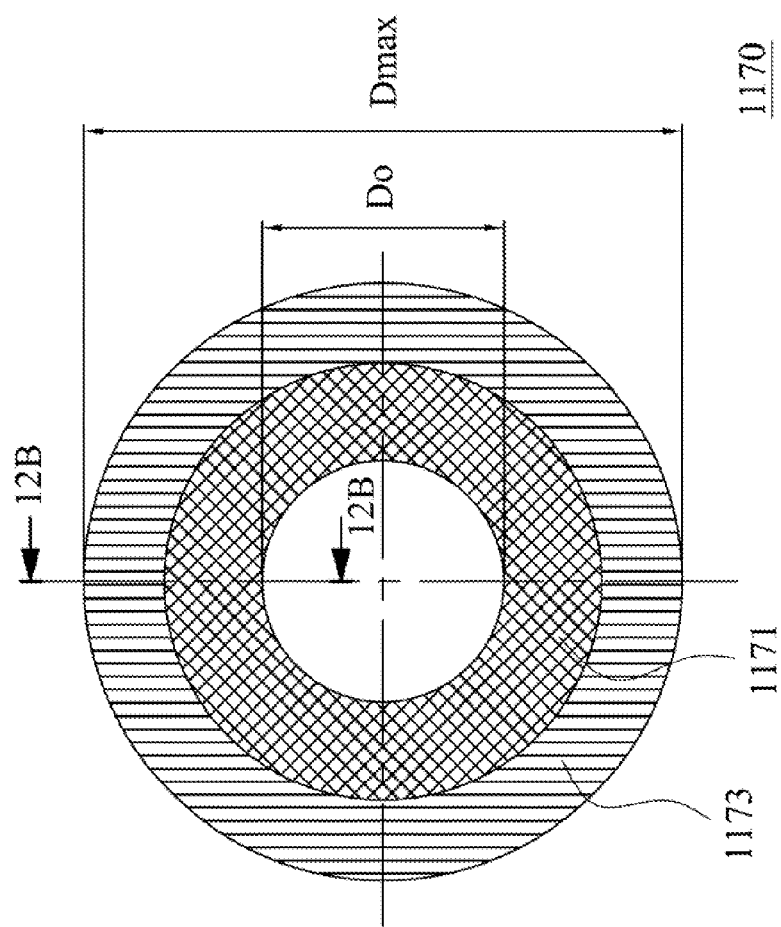
FIG. 12A is a schematic view of an annular optical element according to yet another aspect of the present disclosure.

FIG. 12A is a schematic view of an annular optical element 1170 according to yet another aspect of the present disclosure. FIG. 12B is a cross-section view of the annular optical element 1170 along the line 12B-12B of FIG. 12A. In FIGS. 12A and 12B, the annular optical element 1170 having a central opening includes, in order from the central opening to an outer boundary, an inner annular part 1171, and an outer annular part 1173 which is connected to the inner annular part 1171, wherein a thickness of the annular optical element 1170 is uniform. When an angle between the outer annular part 1173 and the inner annular part 1171 is A, the following condition is satisfied: 0 degree<|A|≤60 degrees. Therefore, the annular optical element 1170 can be located between two lens elements of a lens assembly for enhancing the image quality. Further, the annular optical element 1170 is suitable for cooperating with the adjacent lens elements, so that the arrangement of the lens assembly would not be limited of the annular optical element 1170.

In FIGS. 12A and 12B, the definition of the parameters H, T Do and Dmax are the same to the parameters in FIGS. 10A and 10B and are satisfied the same condition, and will not state again herein.

1st Embodiment

FIG. 1A is a schematic view of an optical photographing lens assembly 100 according to 1st embodiment of the present disclosure. FIG. 1B is an enlarged view of an annular optical element 160 of the optical photographing lens assembly 100 of FIG. 1A. In FIG. 1A, the optical photographing lens assembly 100 includes, in order from an object side to an image side, a first lens element 110, an annular optical element 160, a second lens element 120, a third lens element 130, a fourth lens element 140, a fifth lens element 150, an IR-cut filter 180 and an image plane 190, wherein the annular optical element 160 is located between the first lens element 110 and the second lens element 120. Each of the first lens element 110 and the second lens element 120 includes a joint surface 111, 121, the joint surface 111 of the first lens element 110 and the joint surface 121 of the second lens element 120 are connected to each other.

The annular optical element 160 has a central opening having a central axis, and in order from the central opening to an outer boundary the annular optical element, the annular optical element 160 includes an inner annular part 161, a middle annular part 162 and an outer annular part 163, wherein the middle annular part 162 is connected to the inner annular part 161, and the outer annular part 163 is connected to the middle annular part 162. The annular optical element 160 is made of plastic material.

As shown in FIGS. 11A and 11B, an angle between the outer annular part 163 and the middle annular part 162 is Ao, and an angle between the middle annular part 162 and the inner annular part 161 is Ai. A minimum distance on the central axis between an end of a surface of the outer annular part 163 which is closest to the central axis and an end of a surface of the inner annular part 161 which is closest to the central axis is H, wherein the surface of the outer annular part 163 and the surface of the inner annular part 161 are located on the same side of the annular optical element 160. A thickness of the annular optical element 160 is T. A distance perpendicular to the central axis between two ends of the inner annular part 161 is Li, a distance perpendicular to the central axis between two ends of the middle annular part 162 is Lm, and a distance perpendicular to the central axis between two ends of the outer annular part 163 is Lo. A diameter of the central opening of the annular optical element 160 is Do, and a maximum outer diameter of the annular optical element 160 is Dmax. An angle between each of the joint surfaces 111, 121 and the central axis is Θ. The values of the parameters according to 1st embodiment of FIGS. 1A and 1B are listed in Table 1 as follows.

TABLE 1

| Ao (deg.) | 60 | Lm (mm) | 0.104 |
| Ai (deg.) | 60 | Li (mm) | 0.215 |
| H (mm) | 0.135 | Do (mm) | 1.85 |
| T (mm) | 0.02 | Dmax (mm) | 3 |
| Lo (mm) | 0.255 | Θ (deg.) | 20 |

Moreover, the values of the parameter from Table 1 can be calculated and satisfied as following conditions stated in Table 2.

TABLE 2

| H/Li | 0.628 | Do/Dmax | 0.62 |

The detailed optical data of the optical photographing lens assembly 100 of the 1st embodiment are shown in Table 3 and the aspheric surface data are shown in Table 4 below.

TABLE 3

1st Embodiment
f = 4.16 mm, Fno = 2.21, HFOV = 36.2 deg.

| Surface # | | Curvature Radius | | Thickness | Material | Index | Abbe # | Focal Length |
|---|---|---|---|---|---|---|---|---|
| 0 | Object | Plano | | infinity | | | | |
| 1 | Ape. Stop | Plano | | −0.289 | | | | |
| 2 | Lens 1 | 1.567 | ASP | 0.501 | Plastic | 1.544 | 55.9 | 3.51 |
| 3 | | 7.726 | ASP | 0.143 | | | | |
| 4 | Lens 2 | 2.820 | ASP | 0.240 | Plastic | 1.640 | 23.3 | −6.40 |
| 5 | | 1.615 | ASP | 0.431 | | | | |
| 6 | Lens 3 | −171.080 | ASP | 0.386 | Plastic | 1.544 | 55.9 | 5.84 |
| 7 | | −3.120 | ASP | 0.446 | | | | |
| 8 | Lens 4 | −0.805 | ASP | 0.377 | Plastic | 1.640 | 23.3 | −8.22 |
| 9 | | −1.124 | ASP | 0.030 | | | | |
| 10 | Lens 5 | 2.213 | ASP | 1.224 | Plastic | 1.544 | 55.9 | 23.15 |
| 11 | | 2.161 | ASP | 0.700 | | | | |
| 12 | IR-cut filter | Plano | | 0.300 | Glass | 1.517 | 64.2 | — |
| 13 | | Plano | | 0.410 | | | | |
| 14 | Image | Plano | | — | | | | |

Note:
Reference wavelength (d-line) is 587.6 nm.
An effective radius of the surface 7 is 1.142 mm.

TABLE 4

Aspheric Coefficients

| Surface # | 2 | 3 | 4 | 5 | 6 |
|---|---|---|---|---|---|
| k = | −5.6729E−02 | −3.6858E+01 | −2.9748E+01 | −7.5419E+00 | −3.5000E+01 |
| A4 = | −1.4173E−03 | −7.9224E−02 | −1.0823E−01 | 1.6294E−02 | −8.0703E−02 |
| A6 = | 3.4141E−02 | 1.2212E−01 | 1.2402E−01 | 5.2629E−02 | −2.8333E−02 |
| A8 = | −4.4188E−02 | −8.9107E−02 | 1.3791E−01 | 1.2888E−01 | 1.5224E−02 |
| A10 = | −1.8227E−02 | −2.0461E−02 | −1.6058E−01 | −2.3347E−01 | −1.9561E−02 |
| A12 = | −9.6568E−02 | 4.2256E−02 | 9.3924E−02 | 1.3023E−01 | −3.0105E−03 |
| A14 = | −7.3915E−02 | −2.9081E−02 | 6.5936E−04 | 8.0060E−03 | 5.1744E−02 |
| A16 = | | | | | −4.2746E−02 |

| Surface # | 7 | 8 | 9 | 10 | 11 |
|---|---|---|---|---|---|
| k = | 1.5855E+00 | −3.6368E+00 | −7.3284E−01 | −2.1900E+01 | −1.0108E+01 |
| A4 = | −2.5215E−02 | −7.2108E−02 | 1.0669E−01 | −1.0677E−01 | −4.7664E−02 |
| A6 = | −3.9166E−02 | −1.6445E−02 | −3.1839E−02 | 6.1972E−02 | 1.7942E−02 |
| A8 = | 1.3165E−02 | 1.2361E−01 | 2.3781E−02 | −3.3262E−02 | −6.8829E−03 |
| A10 = | 2.7580E−02 | −4.5828E−02 | 9.6604E−03 | 1.4699E−02 | 1.8782E−03 |
| A12 = | −7.9444E−03 | −6.7087E−03 | −3.2436E−03 | −3.8116E−03 | −3.2921E−04 |
| A14 = | −3.3437E−03 | 2.7455E−03 | −2.6915E−03 | 5.0680E−04 | 3.3006E−05 |
| A16 = | | 2.8805E−04 | 7.7123E−04 | −2.7047E−05 | −1.4013E−06 |

In Table 3, the curvature radius, the thickness and the focal length are shown in millimeters (mm). Surface numbers 0-14 represent the surfaces sequentially arranged from the object-side to the image-side along the optical axis. In Table 4, k represents the conic coefficient of the equation of the aspheric surface profiles. A4-A16 represent the aspheric coefficients ranging from the 4th order to the 16th order.

2nd Embodiment

Figures 2A, 2B:
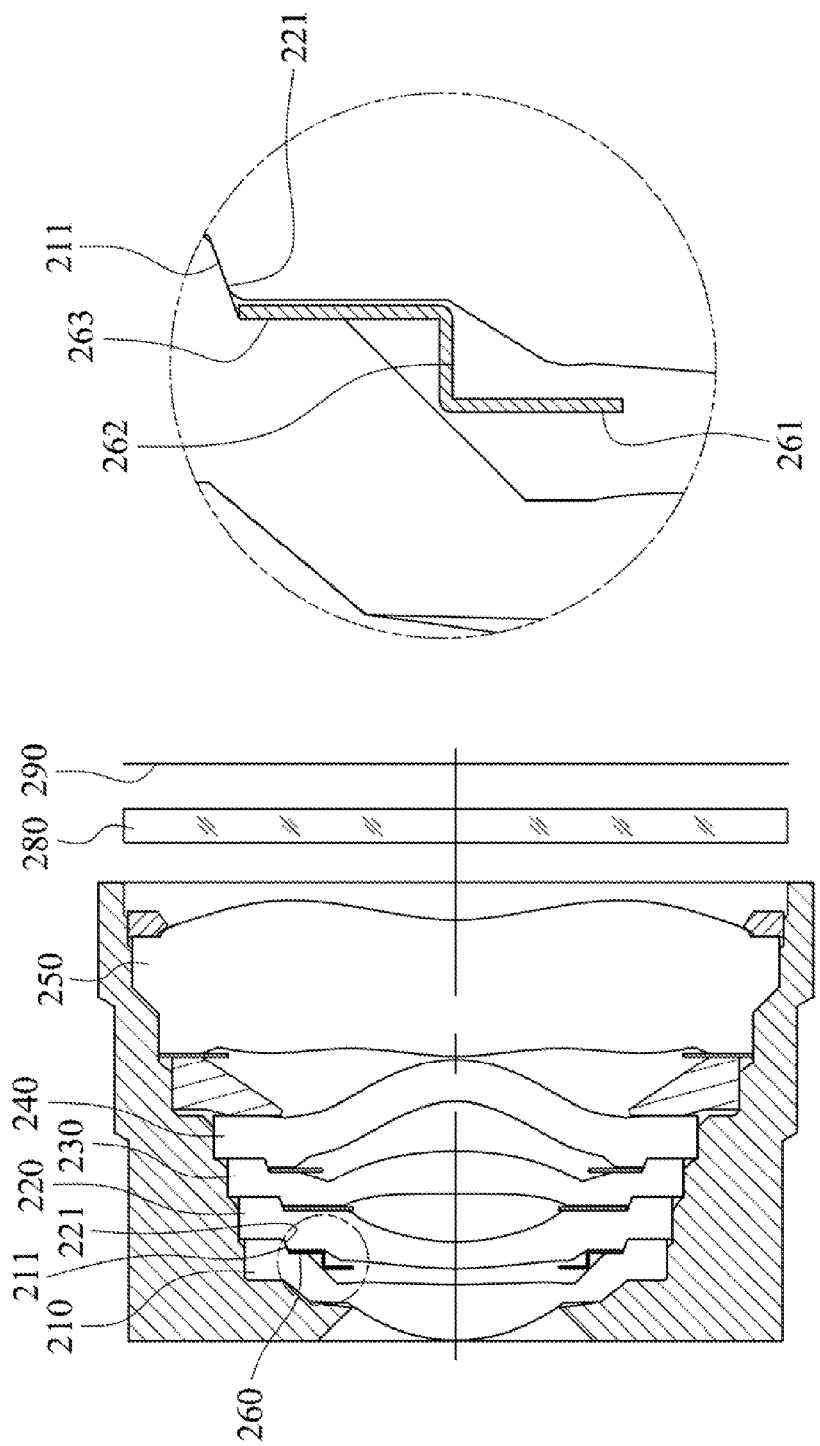
FIG. 2A is a schematic view of an optical photographing lens assembly according to 2nd embodiment of the present disclosure.
FIG. 2B is an enlarged view of an annular optical element of the optical photographing lens assembly of FIG. 2A.

FIG. 2A is a schematic view of an optical photographing lens assembly 200 according to 2nd embodiment of the present disclosure. FIG. 2B is an enlarged view of an annular optical element 260 of the optical photographing lens assembly 200 of FIG. 2A. In FIG. 2A, the optical photographing lens assembly 200 includes, in order from an object side to an image side, a first lens element 210, an annular optical element 260, a second lens element 220, a third lens element 230, a fourth lens element 240, a fifth lens element 250, an IR-cut filter 280 and an image plane 290, wherein the annular optical element 260 is located between the first lens element 210 and the second lens element 220. Each of the first lens element 210 and the second lens element 220 includes a joint surface 211, 221, the joint surface 211 of the first lens element 210 and the joint surface 221 of the second lens element 220 are connected to each other.

In FIG. 2B, the annular optical element 260 has a central opening having a central axis, and in order from the central opening to an outer boundary the annular optical element, the annular optical element 260 includes an inner annular part 261, a middle annular part 262 and an outer annular part 263, wherein the middle annular part 262 is connected to the inner annular part 261, and the outer annular part 263 is connected to the middle annular part 262. The annular optical element 260 is made of metallic material.

The values of the parameters according to 2nd embodiment of FIGS. 2A and 2B are listed in Table 5 as follows, wherein the definition of the parameters is the same of 1st embodiment, and will not state again herein.

TABLE 5

| Ao (deg.) | 90 | Lm (mm) | 0.02 |
|---|---|---|---|
| Ai (deg.) | 90 | Li (mm) | 0.255 |
| H (mm) | 0.14 | Do (mm) | 1.85 |
| T (mm) | 0.02 | Dmax (mm) | 3 |
| Lo (mm) | 0.3 | Θ (deg.) | 20 |

Moreover, the values of the parameter from Table 5 can be calculated and satisfied as following conditions stated in Table 6.

TABLE 6

| H/Li | 0.549 | Do/Dmax | 0.62 |
|---|---|---|---|

The detailed optical data and the aspheric surface data of the optical photographing lens assembly 200 of the 2nd embodiment are the same as shown in Table 3 and Table 4 of 1st embodiment, and will not state again herein.

3rd Embodiment

Figures 3A, 3B:
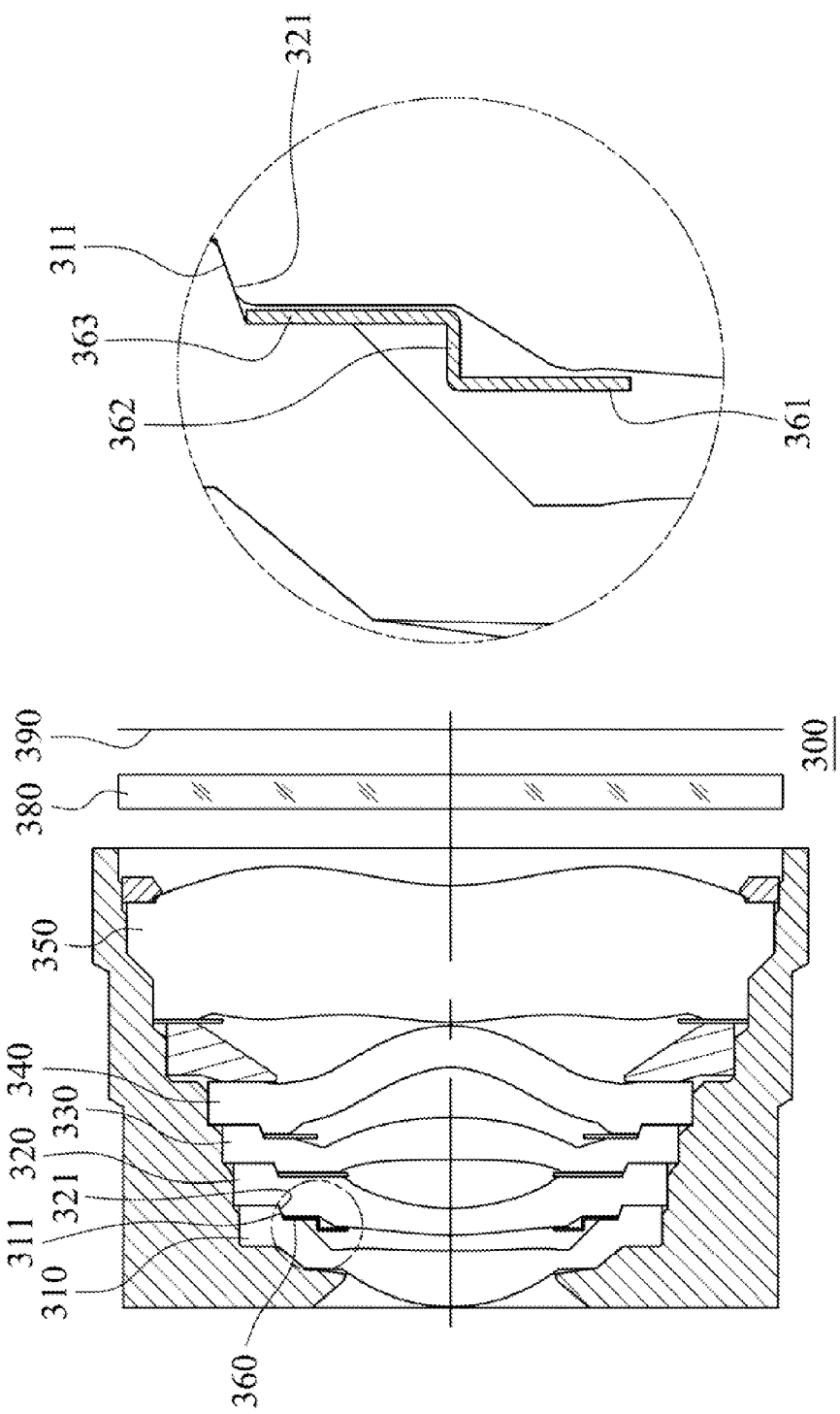
FIG. 3A is a schematic view of an optical photographing lens assembly according to 3rd embodiment of the present disclosure.
FIG. 3B is an enlarged view of an annular optical element of the optical photographing lens assembly of FIG. 3A.

FIG. 3A is a schematic view of an optical photographing lens assembly 300 according to 3rd embodiment of the present disclosure. FIG. 3B is an enlarged view of an annular optical element 360 of the optical photographing lens assembly 300 of FIG. 3A. In FIG. 3A, the optical photographing lens assembly 300 includes, in order from an object side to an image side, a first lens element 310, an annular optical element 360, a second lens element 320, a third lens element 330, a fourth lens element 340, a fifth lens element 350, an IR-cut filter 380 and an image plane 390, wherein the annular optical element 360 is located between the first lens element 310 and the second lens element 320. Each of the first lens element 310 and the second lens element 320 includes a joint surface 311, 321, the joint surface 311 of the first lens element 310 and the joint surface 321 of the second lens element 320 are connected to each other.

In FIG. 3B, the annular optical element 360 has a central opening having a central axis, and in order from the central opening to an outer boundary the annular optical element, the annular optical element 360 includes an inner annular part 361, a middle annular part 362 and an outer annular part 363, wherein the middle annular part 362 is connected to the inner annular part 361, and the outer annular part 363 is connected to the middle annular part 362. The annular optical element 360 is made of metallic material.

The values of the parameters according to 3rd embodiment of FIGS. 3A and 3B are listed in Table 7 as follows, wherein the definition of the parameters is the same of 1st embodiment, and will not state again herein.

TABLE 7

| Ao (deg.) | 90 | Lm (mm) | 0.02 |
| Ai (deg.) | 90 | Li (mm) | 0.255 |
| H (mm) | 0.1 | Do (mm) | 1.85 |
| T (mm) | 0.02 | Dmax (mm) | 3 |
| Lo (mm) | 0.3 | Θ (deg.) | 20 |

Moreover, the values of the parameter from Table 7 can be calculated and satisfied as following conditions stated in Table 8.

TABLE 8

| H/Li | 0.392 | Do/Dmax | 0.62 |

The detailed optical data and the aspheric surface data of the optical photographing lens assembly 300 of the 3rd embodiment are the same as shown in Table 3 and Table 4 of 1st embodiment, and will not state again herein.

4th Embodiment

Figure 4B:
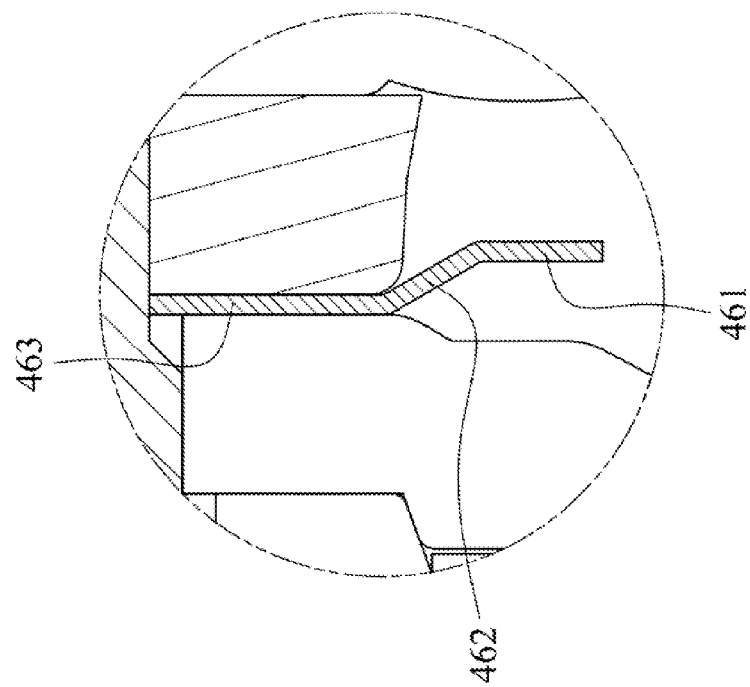
FIG. 4B is an enlarged view of an annular optical element of the optical photographing lens assembly of FIG. 4A.
Figure 4A:
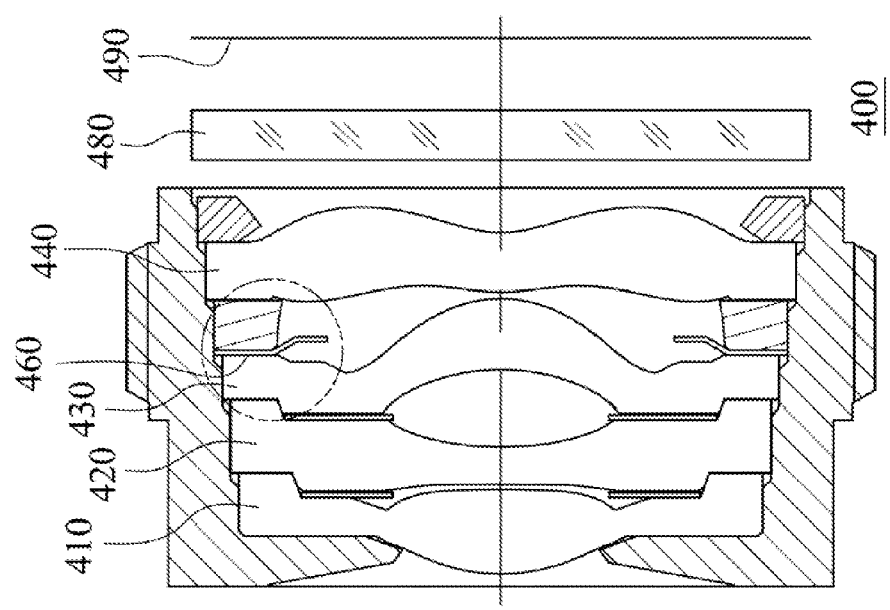
FIG. 4A is a schematic view of an optical photographing lens assembly according to 4th embodiment of the present disclosure.

FIG. 4A is a schematic view of an optical photographing lens assembly 400 according to 4th embodiment of the present disclosure. FIG. 4B is an enlarged view of an annular optical element 460 of the optical photographing lens assembly 400 of FIG. 4A. In FIG. 4A, the optical photographing lens assembly 400 includes, in order from an object side to an image side, a first lens element 410, a second lens element 420, a third lens element 430, an annular optical element 460, a fourth lens element 440, an IR-cut filter 480 and an image plane 490, wherein the annular optical element 460 is located between the third lens element 430 and the fourth lens element 440.

In FIG. 4B, the annular optical element 460 has a central opening having a central axis, and in order from the central opening to an outer boundary the annular optical element, the annular optical element 460 includes an inner annular part 461, a middle annular part 462 and an outer annular part 463, wherein the middle annular part 462 is connected to the inner annular part 461, and the outer annular part 463 is connected to the middle annular part 462. The annular optical element 460 is made of plastic material.

The values of the parameters according to 4th embodiment of FIGS. 4A and 4B are listed in Table 9 as follows, wherein the definition of the parameters is the same of 1st embodiment, and will not state again herein.

TABLE 9

| Ao (deg.) | 30 | Lm (mm) | 0.149 |
| Ai (deg.) | 30 | Li (mm) | 0.182 |
| H (mm) | 0.08 | Do (mm) | 2.087 |
| T (mm) | 0.03 | Dmax (mm) | 3.45 |
| Lo (mm) | 0.35 | | |

Moreover, the values of the parameter from Table 9 can be calculated and satisfied as following conditions stated in Table 10.

TABLE 10

| H/Li | 0.440 | Do/Dmax | 0.60 |

The detailed optical data of the optical photographing lens assembly 400 of the 4th embodiment are shown in Table 11 and the aspheric surface data are shown in Table 12 below.

TABLE 11

4th Embodiment
f = 2.64 mm, Fno = 2.20, HFOV = 34.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.145 | | | | |
| 2 | Lens 1 | 1.108 | ASP | 0.505 | Plastic | 1.544 | 55.9 | 1.78 |
| 3 | | −6.351 | ASP | 0.030 | | | | |
| 4 | Lens 2 | −16.290 | ASP | 0.230 | Plastic | 1.634 | 23.8 | −3.21 |
| 5 | | 2.334 | ASP | 0.462 | | | | |
| 6 | Lens 3 | −1.162 | ASP | 0.429 | Plastic | 1.544 | 55.9 | 3.05 |
| 7 | | −0.772 | ASP | 0.039 | | | | |
| 8 | Lens 4 | 1.225 | ASP | 0.359 | Plastic | 1.544 | 55.9 | −3.35 |
| 9 | | 0.657 | ASP | 0.420 | | | | |
| 10 | IR-cut filter | Plano | | 0.300 | Glass | 1.517 | 64.2 | — |
| 11 | | Plano | | 0.433 | | | | |
| 12 | Image | Plano | | — | | | | |

Note:
Reference wavelength (d-line) is 587.6 nm.

TABLE 12

Aspheric Coefficients

| Surface # | 2 | 3 | 4 | 5 |
|---|---|---|---|---|
| k = | −1.1224E+00 | −3.6097E+00 | −1.6317E+00 | −7.4686E+00 |
| A4 = | 2.1855E−02 | 1.9071E−01 | 3.5292E−01 | 4.5977E−01 |
| A6 = | 5.4404E−01 | −1.8930E+00 | −1.7884E+00 | −9.2902E−01 |
| A8 = | −3.4162E+00 | −2.1829E−01 | −1.3962E+00 | 2.1864E+00 |

TABLE 12-continued

| Aspheric Coefficients | | | | |
|---|---|---|---|---|
| A10 = | 8.4391E+00 | 8.6873E+00 | 1.1251E+01 | −4.3154E+00 |
| A12 = | −8.1402E+00 | −1.2632E+01 | −9.2786E+00 | 5.9596E+00 |
| A14 = | −6.5867E+00 | 2.5601E+00 | | |

| Surface # | 6 | 7 | 8 | 9 |
|---|---|---|---|---|
| k = | −1.2598E+01 | −3.9151E+00 | −9.5638E−01 | −4.5366E+00 |
| A4 = | −2.3096E−01 | −8.4683E−01 | −1.5708E+00 | −6.2828E−01 |
| A6 = | −2.8377E+00 | 1.2972E+00 | 2.5735E+00 | 9.0508E−01 |
| A8 = | 1.4534E+01 | −1.5047E+00 | −2.6162E+00 | −9.3589E−01 |
| A10 = | −3.6434E+01 | 8.3131E−01 | 1.6897E+00 | 6.3633E−01 |
| A12 = | 3.7382E+01 | 1.6276E+00 | −6.5295E−01 | −2.7145E−01 |
| A14 = | 2.0500E+01 | −1.5594E+00 | 1.3590E−01 | 6.4125E−02 |
| A16 = | −5.8265E+01 | | −1.1562E−02 | −6.1269E−03 |

The definitions of the Table 11 and Table 12 of 4th embodiment are the same as Table 3 and Table 4 of the 1st embodiment. Therefore, an explanation in this regard will not be provided again.

5th Embodiment

Figure 5A:
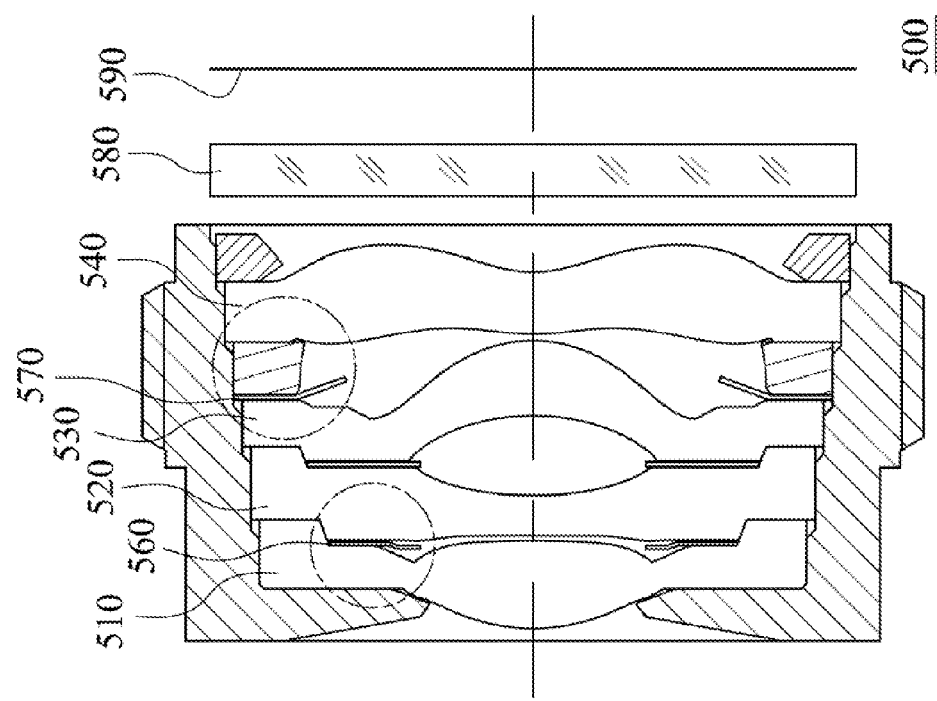
FIG. 5A is a schematic view of an optical photographing lens assembly according to 5th embodiment of the present disclosure.
Figure 5C:
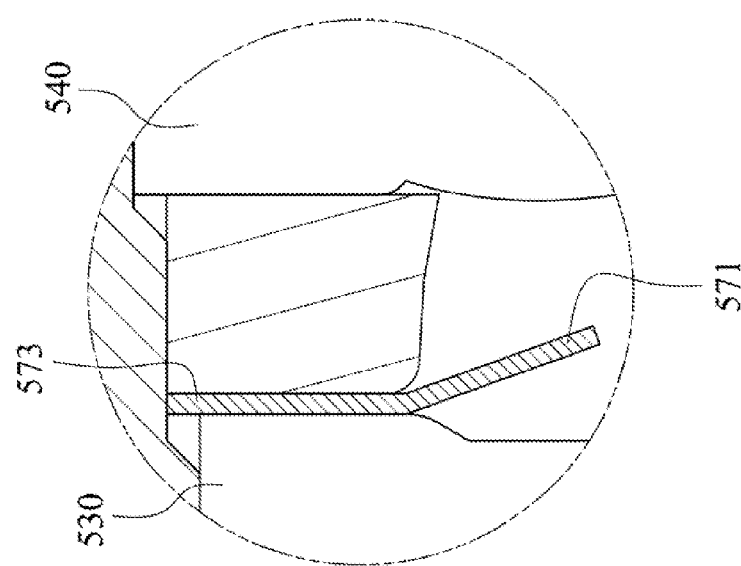
FIG. 5C is an enlarged view of an annular optical element of the optical photographing lens assembly of FIG. 5A.
Figure 5B:
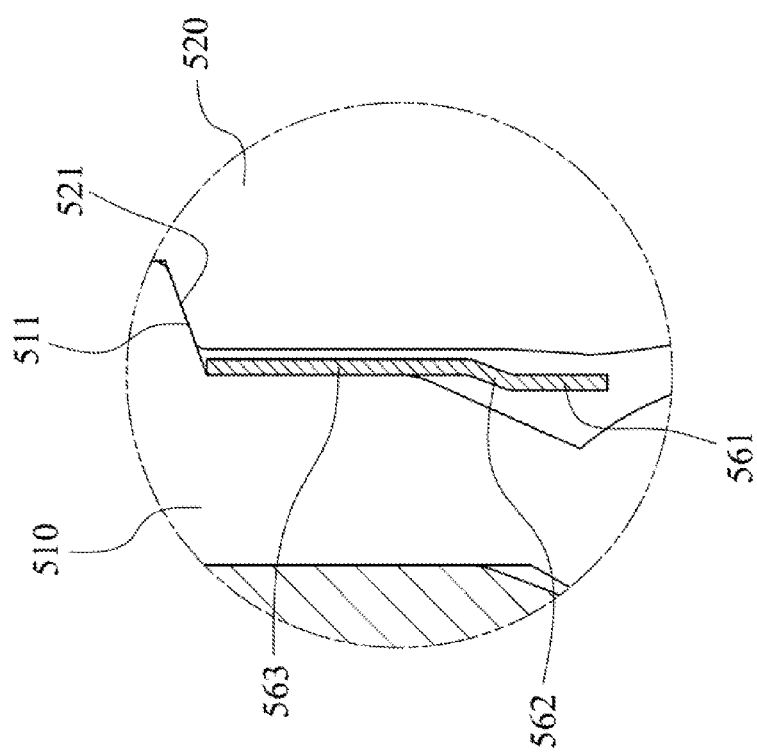
FIG. 5B is an enlarged view of an annular optical element of the optical photographing lens assembly of FIG. 5A.

FIG. 5A is a schematic view of an optical photographing lens assembly 500 according to 5th embodiment of the present disclosure. FIG. 5B is an enlarged view of an annular optical element 560 of the optical photographing lens assembly 500 of FIG. 5A. FIG. 5C is an enlarged view of an annular optical element 570 of the optical photographing lens assembly 500 of FIG. 5A. In FIG. 5A, the optical photographing lens assembly 500 includes, in order from an object side to an image side, a first lens element 510, an annular optical element 560, a second lens element 520, the third lens element 530, an annular optical element 570, a fourth lens element 540, an IR-cut filter 580 and an image plane 590. The optical photographing lens assembly 500 according to 5th embodiment includes two annular optical elements 560, 570, wherein the annular optical element 560 is located between the first lens element 510 and the second lens element 520, and the annular optical element 570 is located between the third lens element 530 and the fourth lens element 540. Each of the first lens element 510 and the second lens element 520 includes a joint surface 511, 521, the joint surface 511 of the first lens element 510 and the joint surface 521 of the second lens element 520 are connected to each other.

In FIG. 5B, the annular optical element 560 has a central opening having a central axis, and in order from the central opening to an outer boundary the annular optical element, the annular optical element 560 includes an inner annular part 561, a middle annular part 562 and an outer annular part 563, wherein the middle annular part 562 is connected to the inner annular part 561, and the outer annular part 563 is connected to the middle annular part 562. The annular optical element 560 is made of metallic material.

The values of the parameters of the first lens element 510, the annular optical element 560 and the second lens element 520 of the optical photographing lens assembly 500 according to 5th embodiment of FIGS. 5A and 5B are listed in Table 13 as follows, wherein the definition of the parameters is the same of 1st embodiment, and will not state again herein.

TABLE 13

| Ao (deg.) | 20 | Lm (mm) | 0.063 |
| Ai (deg.) | 20 | Li (mm) | 0.122 |

TABLE 13-continued

| H (mm) | 0.02 | Do (mm) | 1.3 |
| T (mm) | 0.02 | Dmax (mm) | 2.35 |
| Lo (mm) | 0.34 | Θ (deg.) | 20 |

Moreover, the values of the parameter from Table 14 can be calculated and satisfied as following conditions stated in Table 13.

TABLE 14

| H/Li | 0.164 | Do/Dmax | 0.55 |

In FIG. 5C, the annular optical element 570 has a central opening having a central axis, and in order from the central opening to an outer boundary the annular optical element, the annular optical element 570 includes an inner annular part 571 and an outer annular part 573, wherein the outer annular part 573 is connected to the inner annular part 571. The annular optical element 570 is made of plastic material.

As shown in FIGS. 12A and 12B, an angle between the outer annular part 573 and the inner annular part 571 is A. A minimum distance on the central axis between an end of a surface of the outer annular part 573 which is closest to the central axis and an end of a surface of the inner annular part 571 which is closest to the central axis is H, wherein the surface of the outer annular part 573 and the surface of the inner annular part 571 are located on the same side of the annular optical element 570. A thickness of the annular optical element 570 is T. A diameter of the central opening of the annular optical element 570 is Do, and a maximum outer diameter of the annular optical element 570 is Dmax. A distance perpendicular to the central axis between two ends of the inner annular part 571 is Li, and a distance perpendicular to the central axis between two ends of the outer annular part 573 is Lo. The values of the parameters of the annular optical element 570 according to 5th embodiment of FIGS. 5A and 5C are listed in Table 15 as follows.

TABLE 15

| A (deg.) | 20 | Li (mm) | 0.295 |
| H (mm) | 0.105 | Do (mm) | 2.146 |
| T (mm) | 0.03 | Dmax (mm) | 3.45 |
| Lo (mm) | 0.358 | | |

Moreover, the values of the parameter from Table 15 can be calculated and satisfied as following conditions stated in Table 16.

TABLE 16

| H/Li | 0.356 | Do/Dmax | 0.62 |
|---|---|---|---|

The detailed optical data and the aspheric surface data of the optical photographing lens assembly 500 of the 5th embodiment are the same as shown in Table 11 and Table 12 of 4th embodiment, and will not state again herein.

6th Embodiment

Figure 6B:
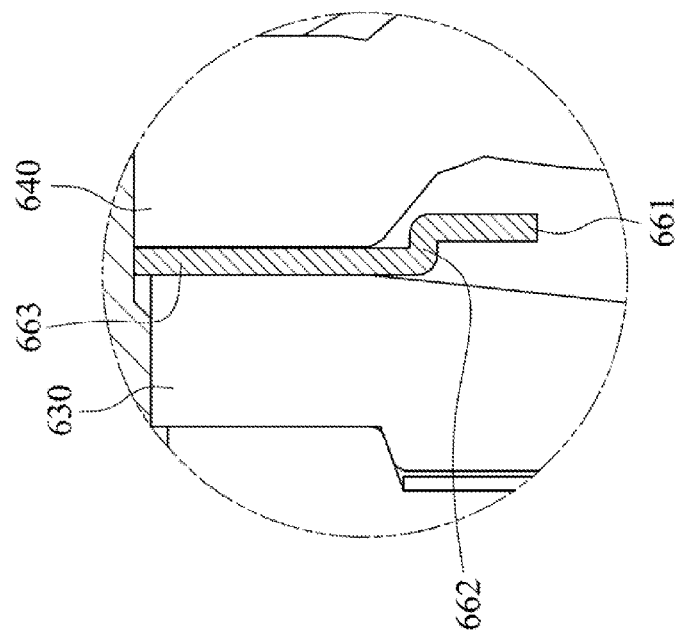
FIG. 6B is an enlarged view of an annular optical element of the optical photographing lens assembly of FIG. 6A.
Figure 6A:
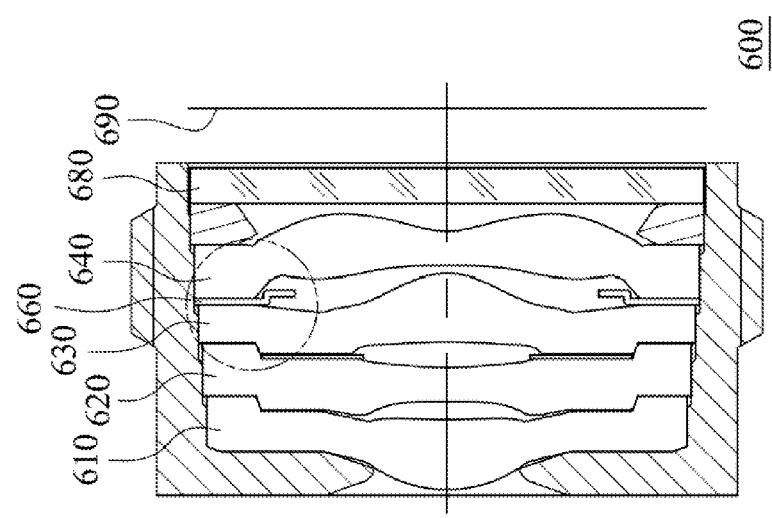
FIG. 6A is a schematic view of an optical photographing lens assembly according to 6th embodiment of the present disclosure.

FIG. 6A is a schematic view of an optical photographing lens assembly 600 according to 6th embodiment of the present disclosure. FIG. 6B is an enlarged view of an annular optical element 660 of the optical photographing lens assembly 600 of FIG. 6A. In FIG. 6A, the optical photographing lens assembly 600 includes, in order from an object side to an image side, a first lens element 610, a second lens element 620, a third lens element 630, an annular optical element 660, a fourth lens element 640, an IR-cut filter 680 and an image plane 690, wherein the annular optical element 660 is located between the third lens element 630 and the fourth lens element 640.

In FIG. 6B, the annular optical element 660 has a central opening having a central axis, and in order from the central opening to an outer boundary the annular optical element, the annular optical element 660 includes an inner annular part 661, a middle annular part 662 and an outer annular part 663, wherein the middle annular part 662 is connected to the inner annular part 661, and the outer annular part 663 is connected to the middle annular part 662. The annular optical element 660 is made of plastic material.

The values of the parameters according to 6th embodiment of FIGS. 6A and 6B are listed in Table 17 as follows, wherein the definition of the parameters is the same of 1st embodiment, and will not state again herein.

TABLE 17

| Ao (deg.) | 90 | Lm (mm) | 0.041 |
|---|---|---|---|
| Ai (deg.) | 90 | Li (mm) | 0.148 |
| H (mm) | 0.05 | Do (mm) | 1.804 |
| T (mm) | 0.04 | Dmax (mm) | 3 |
| Lo (mm) | 0.409 | | |

Moreover, the values of the parameter from Table 17 can be calculated and satisfied as following conditions stated in Table 18.

TABLE 18

| H/Li | 0.338 | Do/Dmax | 0.60 |
|---|---|---|---|

The detailed optical data of the optical photographing lens assembly 600 of the 6th embodiment are shown in Table 19 and the aspheric surface data are shown in Table 20 below.

TABLE 19

6th Embodiment
f = 1.81 mm, Fno = 2.08, HFOV = 35.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.124 | | | | |
| 2 | Lens 1 | 0.769 | ASP | 0.419 | Plastic | 1.544 | 55.9 | 1.72 |
| 3 | | 3.518 | ASP | 0.107 | | | | |
| 4 | Lens 2 | −79.504 | ASP | 0.200 | Plastic | 1.640 | 23.3 | −3.53 |
| 5 | | 2.325 | ASP | 0.155 | | | | |
| 6 | Lens 3 | −2.974 | ASP | 0.406 | Plastic | 1.544 | 55.9 | 0.84 |
| 7 | | −0.416 | ASP | 0.045 | | | | |
| 8 | Lens 4 | 42.505 | ASP | 0.206 | Plastic | 1.544 | 55.9 | −0.84 |
| 9 | | 0.450 | ASP | 0.300 | | | | |
| 10 | IR-cut filter | Plano | | 0.200 | Glass | 1.517 | 64.2 | — |
| 11 | | Plano | | 0.225 | | | | |
| 12 | Image | Plano | | — | | | | |

Note:
Reference wavelength (d-line) is 587.6 nm.

TABLE 20

Aspheric Coefficients

| Surface # | 2 | 3 | 4 | 5 |
|---|---|---|---|---|
| k = | −6.8076E−01 | −6.6511E+01 | 1.0000E+00 | 1.8053E+01 |
| A4 = | 1.9352E−01 | −2.3536E−01 | −1.1660E−00 | −3.6697E−01 |
| A6 = | −2.1566E−01 | −3.1579E+00 | −4.1824E+00 | −2.6543E+00 |
| A8 = | 3.8076E+00 | 5.5043E+00 | 4.5404E+00 | 7.3984E+00 |
| A10 = | −1.3505E+01 | −1.7744E+01 | 7.2926E+01 | |
| A12 = | | | −1.7017E+02 | |

| Surface # | 6 | 7 | 8 | 9 |
|---|---|---|---|---|
| k = | 2.8829E+01 | −4.0640E+00 | −9.0000E+01 | −7.5531E+00 |
| A4 = | 6.8299E−01 | −6.7244E−01 | −1.9155E+00 | −1.2374E+00 |
| A6 = | −3.4056E+00 | 1.0879E+00 | 7.8225E+00 | 3.7692E+00 |
| A8 = | 5.4196E+01 | 1.7908E+01 | −1.8050E+01 | −8.5627E+00 |
| A10 = | −4.0908E+02 | −4.2233E+01 | 2.7918E+01 | 1.2803E+01 |

TABLE 20-continued

| Aspheric Coefficients | | | | |
|---|---|---|---|---|
| A12 = | 1.5752E+03 | −3.0832E+01 | −2.7604E+01 | −1.2114E+01 |
| A14 = | −3.1587E+03 | 1.6119E+02 | 1.5482E+01 | 6.4760E+00 |
| A16 = | 2.4643E+03 | −1.2194E+02 | −3.7215E+00 | −1.4598E+00 |

The definitions of the Table 19 and Table 20 of 6th embodiment are the same as Table 3 and Table 4 of the 1st embodiment. Therefore, an explanation in this regard will not be provided again.

7th Embodiment

FIG. 7A is a schematic view of an optical photographing lens assembly 700 according to 7th embodiment of the present disclosure. FIG. 7B is an enlarged view of an annular optical element 760 of the optical photographing lens assembly 700 of FIG. 7A. In FIG. 7A, the optical photographing lens assembly 700 includes, in order from an object side to an image side, a first lens element 710, a second lens element 720, a third lens element 730, an annular optical element 760, a fourth lens element 740, an IR-cut filter 780 and an image plane 790, wherein the annular optical element 760 is located between the third lens element 730 and the fourth lens element 740.

In FIG. 7B, the annular optical element 760 has a central opening having a central axis, and in order from the central opening to an outer boundary the annular optical element, the annular optical element 760 includes an inner annular part 761, a middle annular part 762 and an outer annular part 763, wherein the middle annular part 762 is connected to the inner annular part 761, and the outer annular part 763 is connected to the middle annular part 762. The annular optical element 760 is made of plastic material.

The values of the parameters according to 7th embodiment of FIGS. 7A and 7B are listed in Table 21 as follows, wherein the definition of the parameters is the same of 1st embodiment, and will not state again herein.

TABLE 21

| Ao (deg.) | 90 | Lm (mm) | 0.03 |
|---|---|---|---|
| Ai (deg.) | 90 | Li (mm) | 0.225 |
| H (mm) | 0.08 | Do (mm) | 1.659 |
| T (mm) | 0.03 | Dmax (mm) | 3 |
| Lo (mm) | 0.418 | | |

Moreover, the values of the parameter from Table 21 can be calculated and satisfied as following conditions stated in Table 22.

TABLE 22

| H/Li | 0.356 | Do/Dmax | 0.55 |
|---|---|---|---|

The detailed optical data and the aspheric surface data of the optical photographing lens assembly 700 of the 7th embodiment are the same as shown in Table 19 and Table 20 of 6th embodiment, and will not state again herein.

8th Embodiment

FIG. 8A is a schematic view of an optical photographing lens assembly 800 according to 8th embodiment of the present disclosure. FIG. 8B is an enlarged view of an annular optical element 860 of the optical photographing 5i lens assembly 800 of FIG. 8A. In FIG. 8A, the optical photographing lens assembly 800 includes, in order from an object side to an image side, a first lens element 810, a second lens element 820, an annular optical element 870, an IR-cut filter 880 and an image plane 890, wherein the annular optical element 860 is located between the second lens element 820 and the third lens element 830.

In FIG. 8B, the annular optical element 870 has a central opening having a central axis, and in order from the central opening to an outer boundary the annular optical element, the annular optical element 870 includes an inner annular part 871 and an outer annular part 873, wherein the inner annular part 871 is connected to the outer annular part 873. The annular optical element 870 is made of plastic material.

As shown in FIGS. 12A and 12B, an angle between the outer annular part 873 and the inner annular part 871 is A. A minimum distance on the central axis between an end of a surface of the outer annular part 873 which is closest to the central axis and an end of a surface of the inner annular part 871 which is closest to the central axis is H, wherein the surface of the outer annular part 873 and the surface of the inner annular part 871 are located on the same side of the annular optical element 870. A thickness of the annular optical element 870 is T. A diameter of the central opening of the annular optical element 870 is Do, and a maximum outer diameter of the annular optical element 870 is Dmax. A distance perpendicular to the central axis between two ends of the inner annular part 871 is Li, and a distance perpendicular to the central axis between two ends of the outer annular part 873 is Lo. The values of the parameters of the annular optical element 870 according to 8th embodiment of FIGS. 8A and 8B are listed in Table 23 as follows.

TABLE 23

| A (deg.) | 15 | Li (mm) | 0.177 |
|---|---|---|---|
| H (mm) | 0.046 | Do (mm) | 0.859 |
| T (mm) | 0.025 | Dmax (mm) | 1.9 |
| Lo (mm) | 0.344 | | |

Moreover, the values of the parameter from Table 23 can be calculated and satisfied as following conditions stated in Table 24.

TABLE 24

| H/Li | 0.260 | Do/Dmax | 0.45 |
|---|---|---|---|

The detailed optical data of the optical photographing lens assembly 800 of the 8th embodiment are shown in Table 25 and the aspheric surface data are shown in Table 26 below.

TABLE 25

8th Embodiment
f = 0.84 mm, Fno = 2.17, HFOV = 37.4 deg.

| Surface # | | Curvature Radius | | Thickness | Material | index | Abbe # | Focal Length |
|---|---|---|---|---|---|---|---|---|
| 0 | Object | Plano | | Infinity | | | | |
| 1 | Ape. Stop | Plano | | −0.045 | | | | |
| 2 | Lens 1 | 0.432 | ASP | 0.244 | Plastic | 1.544 | 55.9 | 0.80 |
| 3 | | 100.000 | ASP | 0.101 | | | | |
| 4 | Lens 2 | −0.318 | ASP | 0.150 | Plastic | 1.634 | 23.8 | −13.24 |
| 5 | | −0.391 | ASP | 0.096 | | | | |
| 6 | Lens 3 | 0.456 | ASP | 0.197 | Plastic | 1.544 | 55.9 | −27.78 |
| 7 | | 0.375 | ASP | 0.100 | | | | |
| 8 | IR-cut filter | Plano | | 0.150 | Glass | 1.517 | 64.2 | — |
| 9 | | Plano | | 0.126 | | | | |
| 10 | Image | Plano | | — | | | | |

Note:
Reference wavelength (d-line) is 587.6 nm.

TABLE 26

Aspheric Coefficients

| | Surface # | | | | | |
|---|---|---|---|---|---|---|
| | 2 | 3 | 4 | 5 | 6 | 7 |
| k = | −5.4186E+00 | 9.0000E+01 | −2.8644E+00 | −1.7432E−01 | −8.8347E+00 | −2.0752E+00 |
| A4 = | 2.1017E+00 | −9.5680E+00 | −3.1999E+01 | −1.4260E+01 | −1.6128E+01 | −1.4144E+01 |
| A6 = | 1.0240E+03 | 3.6213E+02 | 1.0333E+03 | 9.2802E+01 | 2.2278E+02 | 1.4449E+02 |
| A8 = | −1.1031E+05 | −2.6607E+04 | −5.9902E+04 | 1.3567E+04 | −1.9468E+03 | −1.0659E+03 |
| A10 = | 6.2276E+06 | 7.4027E+05 | 2.1019E+06 | −5.5755E+05 | 1.1809E+04 | 5.2195E+03 |
| A12 = | −1.9754E+08 | −8.6320E+06 | −3.2511E+07 | 1.1294E+07 | −4.7107E+04 | −1.5814E+04 |
| A14 = | 3.2904E+09 | −4.2830E+06 | 1.5985E+08 | −1.0746E+08 | 1.0883E+05 | 2.6424E+04 |
| A16 = | −2.2367E+10 | 6.0169E+08 | 3.8813E+08 | 3.8363E+08 | −1.0856E+05 | −1.8475E+04 |

The definitions of the Table 25 and Table 26 of 8th embodiment are the same as Table 3 and Table 4 of the 1st embodiment. Therefore, an explanation in this regard will not be provided again.

9th Embodiment

Figure 9A:
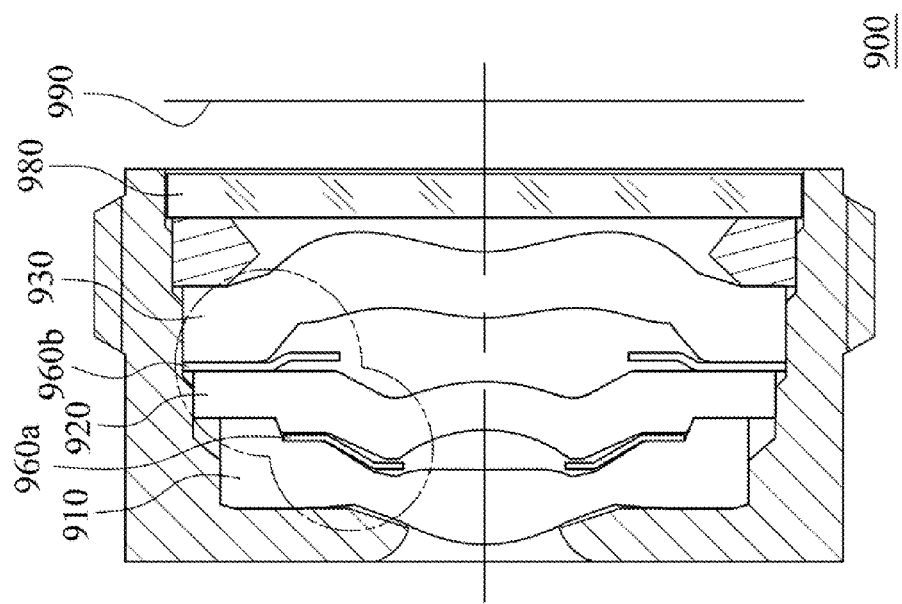
FIG. 9A is a schematic view of an optical photographing lens assembly according to 9th embodiment of the present disclosure.
Figure 9C:
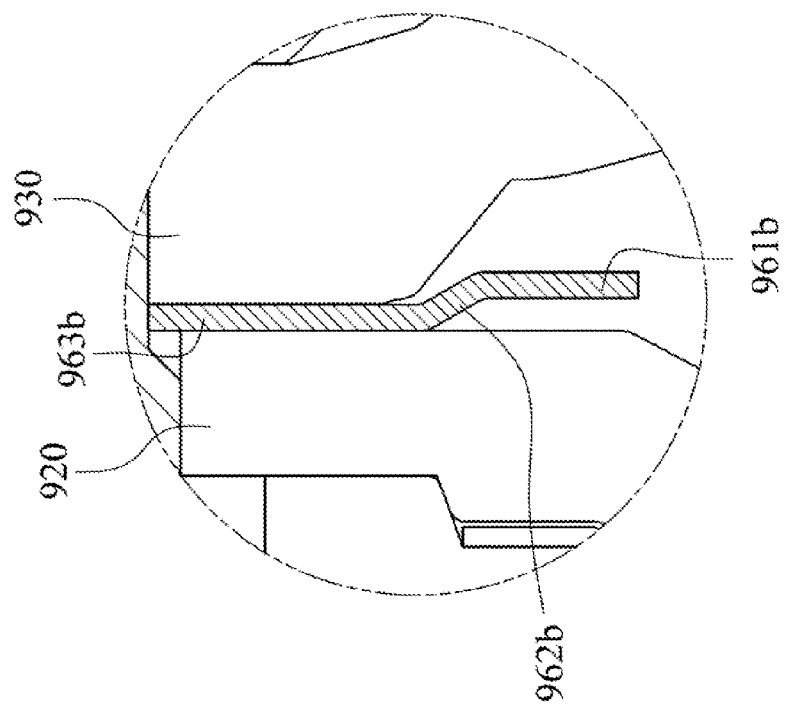
FIG. 9C is an enlarged view of an annular optical element of the optical photographing lens assembly of FIG. 9A.
Figure 9B:
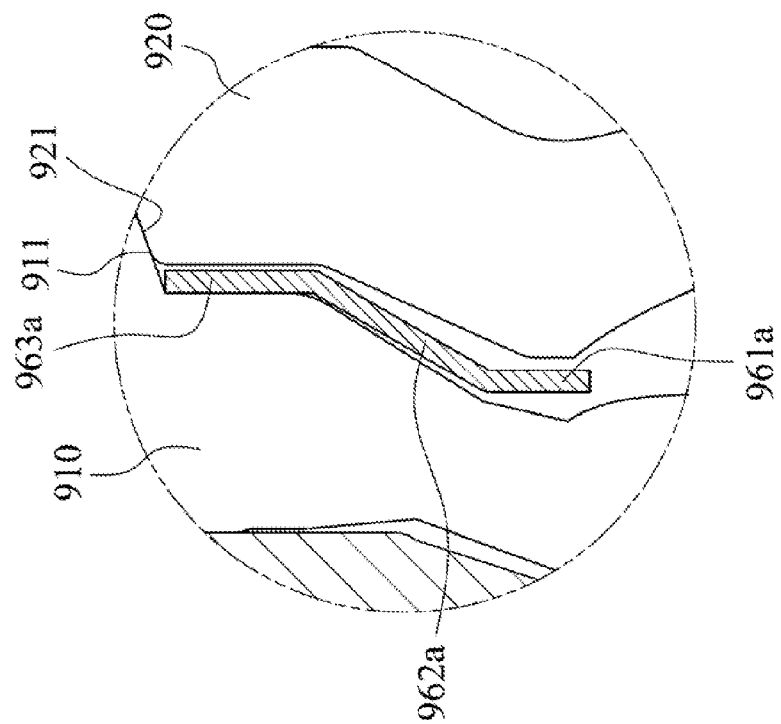
FIG. 9B is an enlarged view of an annular optical element of the optical photographing lens assembly of FIG. 9A.

FIG. 9A is a schematic view of an optical photographing lens assembly 900 according to 9th embodiment of the present disclosure. FIG. 9B is an enlarged view of an annular optical element 960a of the optical photographing lens assembly 900 of FIG. 9A. FIG. 9C is an enlarged view of an annular optical element 960b of the optical photographing lens assembly 900 of FIG. 9A. In FIG. 9A, the optical photographing lens assembly 900 includes, in order from an object side to an image side, a first lens element 910, an annular optical element 960a, a second lens element 920, an annular optical element 960b, the third lens element 930, an IR-cut filter 980 and an image plane 990. The optical photographing lens assembly 900 according to 9th embodiment includes two annular optical elements 960a, 960b, wherein the annular optical element is located between the first lens element 910 and the second lens element 920, and the annular optical element 960b is located between the second lens element 920 and the third lens element 930. Each of the first lens element 910 and the second lens element 920 includes a joint surface 911, 921, the joint surface 911 of the first lens element 910 and the joint surface 921 of the second lens element 920 are connected to each other.

In FIGS. 9B and 9C, each of the annular optical elements 960a, 960b has a central opening having a central axis, and in order from the central opening to an outer boundary the annular optical element, each of the annular optical elements 960a, 960b includes an inner annular part 961a, 961b, a middle annular part 962a, 962b and an outer annular part 963a, 963b, wherein each of the middle annular parts 962a, 962b is connected to each of the inner annular parts 961a, 961b, and each of the outer annular parts 963a, 963b is connected to each of the middle annular parts 962a, 962b. Both of the annular optical elements 960a, 960b are made of plastic material.

The values of the parameters of the annular optical element 960a of the optical photographing lens assembly 900 according to 9th embodiment of FIGS. 9A and 9B are listed in Table 27 as follows, wherein the definition of the parameters is the same of 1st embodiment, and will not state again herein.

TABLE 27

| Ao (deg.) | 30 | Lm (mm) | 0.245 |
|---|---|---|---|
| Ai (deg.) | 30 | Li (mm) | 0.133 |
| H (mm) | 0.135 | Do (mm) | 0.78 |
| T (mm) | 0.03 | Dmax (mm) | 1.93 |
| Lo (mm) | 0.197 | Θ (deg.) | 20 |

Moreover, the values of the parameter from Table 27 can be calculated and satisfied as following conditions stated in Table 28.

TABLE 28

| H/Li | 1.015 | Do/Dmax | 0.40 |
|---|---|---|---|

The values of the parameters of the annular optical element 960b of the optical photographing lens assembly 900 according to 9th embodiment of FIGS. 9A and 9C are listed in Table 29 as follows, wherein the definition of the parameters is the same of 1st embodiment, and will not state again herein.

TABLE 29

| Ao (deg.) | 30 | Lm (mm) | 0.114 |
|---|---|---|---|
| Ai (deg.) | 30 | Li (mm) | 0.229 |
| H (mm) | 0.05 | Do (mm) | 1.389 |
| T (mm) | 0.04 | Dmax (mm) | 2.9 |
| Lo (mm) | 0.412 | | |

Moreover, the values of the parameter from Table 29 can be calculated and satisfied as following conditions stated in Table 30.

TABLE 30

| H/Li | 0.218 | Do/Dmax | 0.48 |
|---|---|---|---|

The detailed optical data of the optical photographing lens assembly 900 of the 9th embodiment are shown in Table 31 and the aspheric surface data are shown in Table 32 below.

TABLE 31

9th Embodiment
f = 1.83 mm, Fno = 2.45, HFOV = 35.0 deg.

| Surface # | | Curvature Radius | | Thickness | Material | Index | Abbe # | Focal Length |
|---|---|---|---|---|---|---|---|---|
| 0 | Object | Plano | | infinity | | | | |
| 1 | Ape. Stop | Plano | | −0.080 | | | | |
| 2 | Lens 1 | 0.727 | ASP | 0.360 | Plastic | 1.544 | 55.9 | 1.49 |
| 3 | | 5.739 | ASP | 0.192 | | | | |
| 4 | Lens 2 | −0.716 | ASP | 0.230 | Plastic | 1.640 | 23.3 | −5.69 |
| 5 | | −1.002 | ASP | 0.310 | | | | |
| 6 | Lens 3 | 0.833 | ASP | 0.315 | Plastic | 1.544 | 55.9 | −25.53 |
| 7 | | 0.682 | ASP | 0.200 | | | | |
| 8 | IR-cut filter | Plano | | 0.200 | Glass | 1.517 | 64.2 | — |
| 9 | | Plano | | 0.322 | | | | |
| 10 | Image | Plano | | — | | | | |

Note:
Reference wavelength (d-line) is 587.6 nm.

TABLE 32

Aspheric Coefficients

| | Surface # | | | | |
|---|---|---|---|---|---|
| 2 | 3 | 4 | 5 | 6 | 7 |
| k = 4.1142E−01 | 5.2284E+01 | 6.2356E−01 | 2.6380E+00 | −2.7816E+00 | −4.0543E+00 |
| A4 = −4.0899E−01 | −8.1136E−01 | −5.1432E−01 | −6.7133E−01 | −2.1942E+00 | −1.1362E+00 |
| A6 = 5.4582E+00 | −1.8293E+00 | −2.7257E+00 | 9.5694E+00 | 4.7232E+00 | 1.9954E+00 |
| A8 = −9.7520E+01 | 7.4055E+00 | 1.0540E+02 | −8.8113E+00 | −7.0657E+00 | −2.6424E+00 |
| A10 = 6.5617E+02 | −1.7600E+02 | −4.0829E+02 | 1.1917E+02 | 6.6380E+00 | 1.5444E+00 |
| A12 = −1.8384E+03 | 2.7093E+02 | −2.7289E+01 | −3.4371E+02 | −2.5550E+00 | 5.6994E−01 |
| A14 = | | | 4.0588E+02 | | −1.4095E+00 |
| A16 = | | | | | 6.1092E−01 |

The definitions of the Table 31 and Table 32 of 9th embodiment are the same as Table 3 and Table 4 of the 1st embodiment. Therefore, an explanation in this regard will not be provided again.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An annular optical element which having a central opening comprising, in order from the central opening to an outer boundary:
    an inner annular part;
    a middle annular part connected to the inner annular part; and
    an outer annular part connected to the middle annular part;
    wherein a thickness of the annular optical element is uniform, an angle between the outer annular part and the middle annular part is Ao, an angle between the middle annular part and the inner annular part is Ai, the thickness of the annular optical element is T, a diameter of the central opening of the annular optical element is Do, a maximum outer diameter of the annular optical element is Dmax, and the following conditions are satisfied:

10 degrees<|Ao|≤90 degrees;
10 degrees<|Ai|≤90 degrees;
0.01 mm<T<0.10 mm; and
0.3<Do/Dmax<0.7.

2. The annular optical element of claim 1, wherein the angle between the outer annular part and the middle annular part is Ao, the angle between the middle annular part and the inner annular part is Ai, and the following conditions are satisfied:

20 degrees<|Ao|≤90 degrees; and
20 degrees<|Ai|≤90 degrees.

3. The annular optical element of claim 2, wherein the central opening has a central axis, a minimum distance on the central axis between an end of a surface of the outer annular part which is closest to the central axis and an end of a surface of the inner annular part which is closest to the central axis is H, wherein the surface of the outer annular part and the surface of the inner annular part are located on the same side of the annular optical element, and the following condition is satisfied:

0.01 mm<H<0.20 mm.

4. The annular optical element of claim 3, wherein the thickness of the annular optical element is T, and the following condition is satisfied:

0.01 mm<T<0.05 mm.

5. The annular optical element of claim 3, wherein the minimum distance on the central axis between the end of the surface of the outer annular part which is closest to the central axis and the end of the surface of the inner annular part which is closest to the central axis is H, wherein the surface of the outer annular part and the surface of the inner annular part are located on the same side of the annular optical element, a distance perpendicular to the central axis between two ends of the inner annular part is Li, and the following condition is satisfied:

0.1<H/Li<1.2.

6. The annular optical element of claim 5, wherein the minimum distance on the central axis between the end of the surface of the outer annular part which is closest to the central axis and the end of the surface of the inner annular part which is closest to the central axis is H, wherein the surface of the outer annular part and the surface of the inner annular part are located on the same side of the annular optical element, and the distance perpendicular to the central axis between the two ends of the inner annular part is Li, and the following condition is satisfied:

0.1<H/Li<0.7.

7. The annular optical element of claim 1, wherein the angle between the outer annular part and the middle annular part is Ao, the angle between the middle annular part and the inner annular part is Ai, and the following condition is satisfied:

|Ao|=|Ai|.

8. The annular optical element of claim 1, wherein the annular optical element is made of plastic material.

9. The annular optical element of claim 1, wherein the annular optical element is made of metallic material.

10. An optical photographing lens assembly comprising, in order from an object side to an image side:
 a first lens element;
 an annular optical element; and
 a second lens element;
 wherein the annular optical element is located between the first lens element and the second lens element, and the annular optical element has a central opening and in order from the central opening to an outer boundary the annular optical element comprises:
  an inner annular part;
  a middle annular part connected to the inner annular part; and
  an outer annular part connected to the middle annular part;
  wherein a thickness of the annular optical element is uniform, an angle between the outer annular part and the middle annular part is Ao, an angle between the middle annular part and the inner annular part is Ai, the thickness of the annular optical element is T, a diameter of the central opening of the annular optical element is Do, a maximum outer diameter of the annular optical element is Dmax, and the following conditions are satisfied:

10 degrees<|Ao|≤90 degrees;
10 degrees<|Ai|≤90 degrees;
0.01 mm<T<0.10 mm; and
0.3<Do/Dmax<0.7.

11. The optical photographing lens assembly of claim 10, wherein the central opening has a central axis, and each of the first lens element and the second lens element comprises a joint surface, the joint surface of the first lens element and the joint surface of the second lens element are connected to each other, an angle between each of the joint surfaces and the central axis is Θ, and the following condition is satisfied:

0 degrees≤Θ<60 degrees.

12. The optical photographing lens assembly of claim 11, wherein the angle between the outer annular part and the middle annular part is Ao, the angle between the middle annular part and the inner annular part is Ai, and the following conditions are satisfied:

20 degrees<|Ao|≤90 degrees; and
20 degrees<|Ai|≤90 degrees.

13. The optical photographing lens assembly of claim 11, wherein the angle between the outer annular part and the middle annular part is Ao, the angle between the middle annular part and the inner annular part is Ai, and the following condition is satisfied:

|Ao|=|Ai|.

14. The optical photographing lens assembly of claim 11, wherein a minimum distance on the central axis between an end of a surface of the outer annular part which is closest to the central axis and an end of a surface of the inner annular part which is closest to the central axis is H, wherein the surface of the outer annular part and the surface of the inner annular part are located on the same side of the annular optical element, and the following condition is satisfied:

0.01 mm<H<0.20 mm.

15. The optical photographing lens assembly of claim 14, wherein the minimum distance on the central axis between the end of the surface of the outer annular part which is closest to the central axis and the end of the surface of the inner annular part which is closest to the central axis is H, wherein the surface of the outer annular part and the surface of the inner annular part are located on the same side of the annular optical element, and a distance perpendicular to the central axis between two ends of the inner annular part is Li, and the following condition is satisfied:

0.1<H/Li<1.2.

16. The optical photographing lens assembly of claim 11, wherein the annular optical element is made of plastic material.

17. The optical photographing lens assembly of claim 11, wherein the annular optical element is made of metallic material.

18. An annular optical element which having a central opening comprising, in order from the central opening to an outer boundary:
- an inner annular part; and
- an outer annular part connected to the inner annular part;
- wherein a thickness of the annular optical element is uniform, an angle between the outer annular part and the inner annular part is A, the thickness of the annular optical element is T, a diameter of the central opening of the annular optical element is Do, a maximum outer diameter of the annular optical element is Dmax, and the following condition is satisfied:
- 0 degree<|A|≤60 degrees;
- 0.01 mm<T<0.05 mm; and
- 0.3<Do/Dmax<0.7.

19. The annular optical element of claim 18, wherein the central opening has a central axis, a minimum distance on the central axis between an end of a surface of the outer annular part which is closest to the central axis and an end of a surface of the inner annular part which is closest to the central axis is H, wherein the surface of the outer annular part and the surface of the inner annular part are located on the same side of the annular optical element, and the following condition is satisfied:
- 0.01 mm<H<0.20 mm.

20. The annular optical element of claim 18, wherein the annular optical element is made of plastic material.

21. The annular optical element of claim 18, wherein the annular optical element is made of metallic material.

* * * * *